…

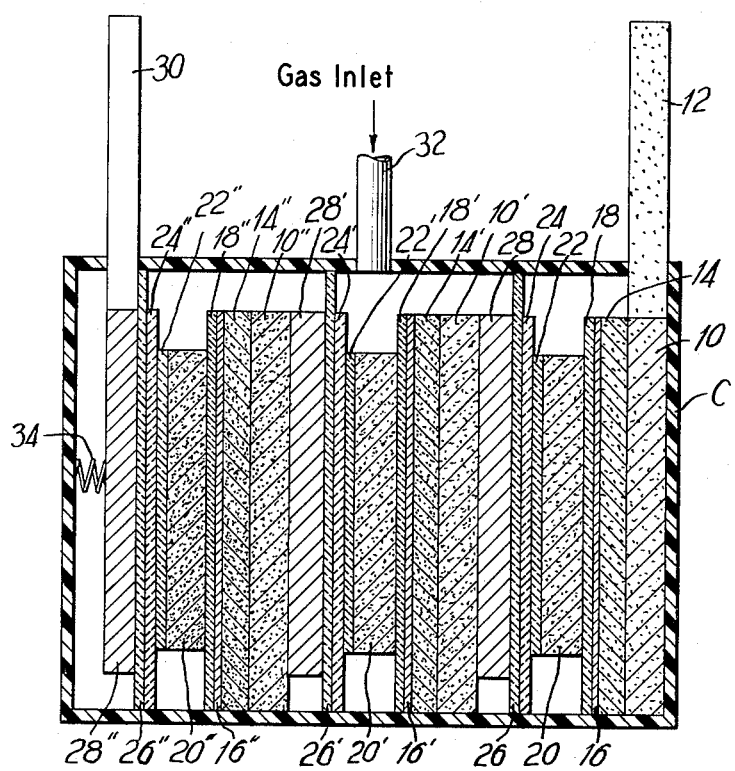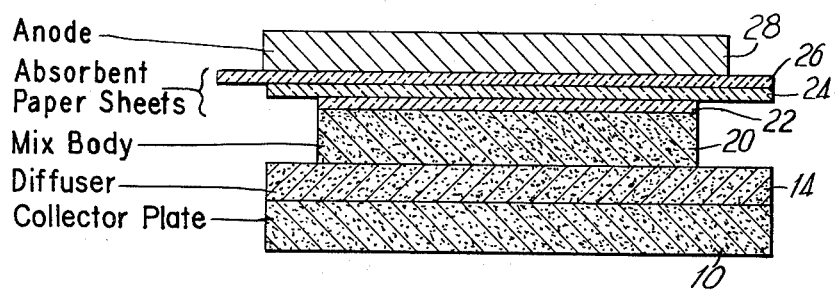

United States Patent Office 2,997,518
Patented Aug. 22, 1961

---

2,997,518
ACTIVATION ACCELERATORS
Edward M. Klopp, Medina, and William G. Darland, Jr., Parma, Ohio, assignors to Union Carbide Corporation, a corporation of New York
Filed June 16, 1958, Ser. No. 742,338
9 Claims. (Cl. 136—90)

This invention relates to compounds capable of accelerating electrolyte-producing reactions in gas-activated deferred action cells and batteries thereof. By "activation" is meant a process whereby water in the combined state is released for electrolyte formation.

It has already been proposed to manufacture gas depolarized deferred action cells which can be activated through the reaction of the same depolarizing gas upon a dry hydrated salt, to produce water and an electrolyte. Undesirably, the activating reaction in question does not proceed instantaneously. As a result, the time required to reach full cell potential necessarily is long. This fact renders cells of this type unsuitable for applications where immediate service is required.

The main object of this invention then is to provide means for accelerating the activating reaction of gas activated, gas depolarized deferred action cells and batteries thereof.

An equally important object of the invention is to provides cell units of novel design embodying the aforesaid means.

In the drawing:
FIG. 1 is a cross-sectional view of a battery of cell units representing one form of the invention; and
FIG. 2 is a cross-sectional view of a modification of the cell units employed in the battery of FIG. 1.

In the practice of the invention there are provided along with dry, hydrated salt materials capable of reacting with a halogen gas to give water and an electrolyte, certain accelerators which can be mixed with such materials and remain stable therewith. These accelerators react rapidly with halogen gases to produce acid materials and heat. Suitable accelerator materials include sulfur, antimony, bismuth, arsenic, phosphorus, selenium, and tellurium. In the case of phosphorus, the white allotrope being unstable in air, the red form is preferred for convenience in handling.

In making a cell using the accelerators of the invention, a mix is formed containing 60 to 89 weight percent of a hydrated salt such as $Sr(OH)_2 \cdot 8H_2O$, $Ba(OH)_2 \cdot 8H_2O$, $Li(OH) \cdot H_2O$ or $ZnF_2 \cdot 4H_2O$, from 2 to 10 weight percent of one or more of the above listed accelerators, and the balance of a finely divided carbon black. The thus formed dry mix is pressed into a cake by applying a pressure of 100 to 500 pounds per square inch. This may conveniently be done on a porous graphite plate or other diffuser, or separately when a trace of suitable binder such as a water-soluble wax, e.g., polyethylene glycol, is used to form a coherent mix cake which may then be placed on the diffuser with or without an interposed separator. If a separator is used, it is also necessary to employ a converter which may suitably be of carbon black to convert the molecular halogen to an active condition.

In the special case of sulfur, which is the preferred accelerator herein, it is recommended that an alternative procedure be used in forming the mix body. This procedure is as follows. The sulfur is first dissolved in carbon disulfide in the ratio of 10 grams of sulfur to 20 to 30 grams of $CS_2$ and then mixed with about 6 to 10 grams of carbon. The carbon disulfide is then allowed to evaporate, and the resulting dry carbon powder, having finely divided sulfur on its surface, is mixed with the chosen salt hydrate.

A battery utilizing a preferred design of a unit cell incorporating the accelerators of the invention appears in FIG. 1. As shown, the battery consists of a container C composed, for example, of a plastic material having therein a series stack of cell units in accord with the invention, there being three cell units shown. The cell units comprise a cathode collector plate 10, 10' and 10" composed of carbon, the collector plate 10 of the first cell unit terminating outside of the container C in a positive tap 12 of the same material. Mounted on one side of plates 10, 10' and 10" of each cell unit is a diffuser 14, 14' and 14", which is fabricated from porous graphite. An extremely thin converter layer 16, 16' and 16" composed of carbon black bonded with methyl cellulose is sprayed on the diffuser of each cell unit. A separator 18, 18' and 18", which consists of a piece of absorbent microfine glass fiber paper about 0.003 inch thick surmounts the converter layers. In contact with separators 18, 18' and 18" for each cell unit is a mix body 20, 20' and 20" which, as indicated previously, contains hydrated salts and one or more accelerators. In contact with the mix body 20, 20' and 20" for each cell unit are three sheets of the same microfine glass fiber paper as employed for the separator. The first sheet 22, 22' and 22" is of the same dimension as the mix body 20, 20' and 20", and is molded therewith to act as a mold release aid. Additional sheets 24, 24' and 24" and 26, 26' and 26" are added to provide sufficient thickness to prevent intercell shortage. In contact with sheet 26, 26' and 26" of each cell unit is a zinc anode 28, 28' and 28", the zinc anode 28" of the last cell unit in the stack similarly terminating outside of the container C in a negative tab 30. The above assembly may also be stacked in parallel with other similar cell units in a conventional fashion. Inlet means 32 for introducing activating gas from a convenient source is also provided to the battery container C. A spring pressure of approximately 15 p.s.i. serves to hold the assembly together and accommodate the shrinkage upon activation. This is provided by means of a spring 34 holding the elements together.

FIG. 2 shows a modification of the unit cell design employed in the battery of FIG. 1, in which the converter and separator layers are omitted.

The present invention may be employed in conjunction with a variety of activating gases including chlorine, fluorine, $ClF$ and $ClF_3$ at room temperature, and bromine at slightly elevated temperature.

Some of the tests using sulfur as the accelerator with chlorine as the activating as well as the depolarizing gas led to an activation time (75 percent of full voltage) under load, of approximately 0.5 second. When such a cell of 5 square inch area was activated on open circuit, and then placed on a 73 ma./in.² drain, the voltage drop in the internal resistance of the cell was 0.04 to 0.08 volt, indicating that the internal cell resistance was in the 0.1 to 0.2 ohm range.

Table I indicates some of the cell characteristics obtained with various types of accelerator-containing mixes.

Table I

| Mix Composition | Accelerator | Open Circuit Voltage (Avg.) | Activation Time Under Load 90% of Peak Load Voltage | Service (Minutes) 90% Peak Load Voltage | Load Volt. | Recovery to 90% Open Circuit Voltage After Discharge |
|---|---|---|---|---|---|---|
| SHO [1] | None | 1.87 | Did not activate under load. | Zero | 0.72 | |
| 91.7% (wt.) SHO<br>8.3% Carbon Black | do | 1.80 | (3 sec. no load) | 1.0 min. at 100 ma./in.² | 1.24 | 45 sec. |
| 76.0% (wt.) SHO<br>19.2% Carbon Black | 4.8% Phosphorus | 1.88 | (0.1 sec. no load) | 30 min. at 73 ma./in.² | 1.77 | 3 min. |
| 71.2% (wt.) SHO<br>17.8% Carbon Black | 11% Sulfur | 1.70 | (0.5 sec. no load) | 66 min. at 73 ma./in.² | 1.68 | 3 sec. |
| 75.7% (wt.) SHO<br>14.9% Carbon Black | 0.2% Phosphorus<br>9.2% Sulfur | 1.80 | | 101 min. at 73 ma./in.² | 1.68 | 1 sec. |
| 78.8% (wt.) SHO<br>11.7% Carbon Black | 9.5% Sulfur | 1.84 | (0.2 sec. no load) | 31 min. at 73 ma./in.² | 1.78 | 15 sec. |
| 78.8% (wt.) SHO<br>11.7% Carbon Black | do | 1.78 (After Test). | 0.5 sec | 23 min. at 100 ma./in.² | 1.80 | 10 sec. |
| 78.8% (wt.) SHO<br>11.7% Carbon Black | do | 1.77 (After Test). | 0.5 sec | 7.5 min. at 200 ma./in.² | 1.67 | 3 sec. |
| 78.8% (wt.) SHO<br>11.7% Carbon Black | do | 1.80 | (0.1 sec. no load) | 2.5 min. at 500 ma./in.² | 1.52 | 1 sec. |

[1] SHO refers to $Sr(OH)_2 \cdot 8H_2O$.
Last four tests involving sulfur accelerator made with ¼ mix weight of previous tests.

The cells of the invention function as follows. In particular, where sulfur is the accelerator, it has been found that the accelerator is oxidized upon introduction of the activating gas, i.e., chlorine, to the sulfate ion which reacts with the hydrated salt material to form an insoluble sulfate and releases water of hydration. The water then dissolves the HCl resulting from the oxidation of the sulfur. In this manner a highly acid electrolyte is formed for the cell discharge reaction, which electrolyte is supported by a matrix of carbon and sulfate.

If a fluoride hydrate is used with an accelerator and chlorine, the resulting electrolyte is a mixture of HCl and HF in solution.

The reactions involved are the following:

The reaction of chlorine with SHO directly proceeds according to the following reaction:

$$2Cl_2 + 2Sr(OH)_2 \cdot 8H_2O \rightarrow 2SrCl_2 \cdot 6H_2O + O_2 + 6H_2O$$

The products are a solution of a neutral salt and an insoluble gas. A yield of 20.4 percent of water based on the solid reactants or 16.1 percent based on total reactants is obtained.

If an accelerator such as sulfur or phosphorus is used, the reaction will take place according to one of the two following equations:

(1) $3Cl_2 + S + Sr(OH)_2 \cdot 8H_2O \rightarrow SrSO_4 + 6HCl + 6H_2O$ (2) $5Cl_2 + 2P + 2Sr(OH)_2 \cdot 8H_2O \rightarrow$
$2SrHPO_4 + 10HCl + 12H_2O$ Both these reactions produce an electrolyte which is a solution of an acid and is thus highly conductive. No inert gas is produced in either reaction. The sulfur reaction produces 36.4 percent water based on solid reactants, or 21.2 percent based on total reactants. The phosphorus reaction produces 36.5 percent water based on solid reactants, or 22.8 percent based on total reactants.

What is claimed is:

1. In combination with a halogen-activated deferred action cell containing hydrated salts which produce water and an electrolyte upon reacting with said halogen, means for accelerating said reaction, said means consisting of at least one element selected from the group consisting of sulfur, phosphorus, antimony, tellurium, selenium, arsenic, bismuth and mixtures thereof, said means being present in said cell in intimate mixture with said hydrated salts.

2. In a halogen-activated deferred action cell, a unit cell comprising a cathode collector plate composed of carbon and terminating in a positive tab, a porous graphite diffuser plate mounted on one side of said collector plate, an extremely thin converter layer of resin-bonded carbon black on the side of said diffuser plate opposite said collector plate, a separator consisting of absorbent microfine glass fiber paper over said converter, a mix body in contact with said separator, said mix body containing from 60 to 89 weight percent of a hydrated salt which produces water and an electrolyte upon reaction with said halogen gas, from 2 to 10 weight percent of an element selected from the group consisting of sulfur, phosphorus, antimony, tellurium, selenium, arsenic, bismuth and mixtures thereof, balance finely divided carbon black, a plurality of sheets of absorbent microfine glass fiber paper, one of said sheets being in contact with said mix and molded therewith and an anode in contact with another of said sheets.

3. A battery consisting of a stack of series connected cells in accord with claim 2.

4. A battery consisting of a stack of parallel-connected cells in accord with claim 2.

5. In a halogen-activated deferred action cell, a unit cell comprising a collector plate composed of carbon and terminating in a positive tab, a porous graphite diffuser plate over said collector plate, a mix body over said diffuser plate in contact therewith, said mix body containing from 60 to 89 weight percent of a hydrated salt which releases water and an electrolyte upon reacting with a halogen gas, from 2 to 10 weight percent of an element selected from the group consisting of sulfur, phosphorus, antimony, tellurium, selenium, arsenic, bismuth and mixtures thereof, balance finely divided carbon black and a plurality of sheets of absorbent microfine glass-fiber paper over said mix body, the inner of said sheets being in contact with said mix and molded therewith and an anode in contact with the outer of said sheets.

6. A battery consisting of a stack of series-connected cells in accord with claim 5.

7. A battery consisting of a stack of parallel-connected cells in accord with claim 5.

8. A cell in accord with claim 5 wherein said hydrated salt is selected from the group consisting of strontium hydroxide octahydrate, barium hydroxide octahydrate and zinc fluoride tetrahydrate.

9. The cell of claim 5 wherein said phosphorus is the red allotropic form thereof.

References Cited in the file of this patent
UNITED STATES PATENTS

| | | |
|---|---|---|
| 1,393,739 | Benner et al. | Oct. 18, 1921 |
| 2,572,296 | Zimmerman et al. | Oct. 23, 1951 |
| 2,612,532 | Heise et al. | Sept. 30, 1952 |
| 2,615,931 | Hatfield | Oct. 28, 1952 |